United States Patent
Wada et al.

(10) Patent No.: US 8,031,822 B2
(45) Date of Patent: Oct. 4, 2011

(54) COMMUNICATION APPARATUS

(75) Inventors: Hirofumi Wada, Osaka (JP); Kou Inoue, Osaka (JP); Takashi Yokoyama, Shiga (JP); Eiichi Sadayuki, Osaka (JP)

(73) Assignee: Panasonic Corporation, Osaka (JP)

( * ) Notice: Subject to any disclaimer, the term of this patent is extended or adjusted under 35 U.S.C. 154(b) by 890 days.

(21) Appl. No.: 11/996,888

(22) PCT Filed: Jul. 25, 2006

(86) PCT No.: PCT/JP2006/314648
§ 371 (c)(1),
(2), (4) Date: Jan. 25, 2008

(87) PCT Pub. No.: WO2007/013443
PCT Pub. Date: Feb. 1, 2007

(65) Prior Publication Data
US 2010/0142627 A1   Jun. 10, 2010

(30) Foreign Application Priority Data
Jul. 27, 2005 (JP) .................. 2005-217096

(51) Int. Cl.
*H04L 7/00* (2006.01)
(52) U.S. Cl. ........................... 375/357; 375/376
(58) Field of Classification Search .................. 375/257, 375/294, 327, 354, 368, 376
See application file for complete search history.

(56) References Cited

U.S. PATENT DOCUMENTS

| | | | |
|---|---|---|---|
| 5,336,874 A * | 8/1994 | Hasegawa | 235/462.19 |
| 5,517,155 A * | 5/1996 | Yamauchi et al. | 331/1 A |
| 5,577,071 A | 11/1996 | Gehrke et al. | |
| 6,205,182 B1 | 3/2001 | Pardini et al. | |
| 6,466,058 B1 * | 10/2002 | Goldman | 327/49 |
| 7,009,913 B2 * | 3/2006 | Yuzawa et al. | 368/10 |
| 2002/0070795 A1 * | 6/2002 | Ausserlechner | 327/552 |
| 2003/0020426 A1 * | 1/2003 | Narumi et al. | 318/611 |
| 2004/0233917 A1 | 11/2004 | Rocas et al. | |
| 2005/0185720 A1 | 8/2005 | Kwok | |
| 2005/0285582 A1 * | 12/2005 | Azuma et al. | 323/282 |

OTHER PUBLICATIONS

European Search Report issued in European Patent Application No. EP 06781560.5 dated Dec. 6, 2010.

* cited by examiner

*Primary Examiner* — Emmanuel Bayard
(74) *Attorney, Agent, or Firm* — McDermott Will & Emery LLP

(57) ABSTRACT

In a single-wire data communication characterized in that a data communication unit time is different in accordance with the polarity of a signal, a communication control time is dependent on a communication data pattern, and hence, the control of the whole system is difficult. A counter for counting a clock continues the counting until a count value thereby obtained reaches a predetermined upper limit value, retains the predetermined upper limit value as the count value until a next pulse is detected in a reception signal after the count value reaches the predetermined upper limit value, and initializes the count value when the next pulse is detected. A data value judger judges a data value depending on whether or not the pulse is detected during a period before the time when the count value reaches the predetermined upper limit value.

10 Claims, 8 Drawing Sheets

COMMUNICATION APPARATUS

RELATED APPLICATIONS

This application is the U.S. National Phase under 35 U.S.C. §371 of International Application No. PCT/JP2006/314648, filed on Jul. 25, 2006, which in turn claims the benefit of Japanese Application No. 2005-217096, filed on Jul. 27, 2005, the disclosures of which Applications are incorporated by reference herein.

FIELD OF THE INVENTION

The present invention relates to a communication apparatus in a single-wire data communication system for communicating data via a single communication wire.

DESCRIPTION OF THE RELATED ART

As a method of judging "0" or "1" of data when the data is communicated between an interrogator and a responsor in a conventional single-wire data communication system, there is a known method mentioned below. In the responsor, a pulse interval of reception data is counted as a clock number, and the clock number based on the pulse interval is compared to a judgment value. The data is judged to be "0" when the number is at most the judgment value, while the data is judged to be "1" when the number is larger than the judgment value. Below is described the conventional technology referring to FIGS. 8A-8C.

Figure 8A:
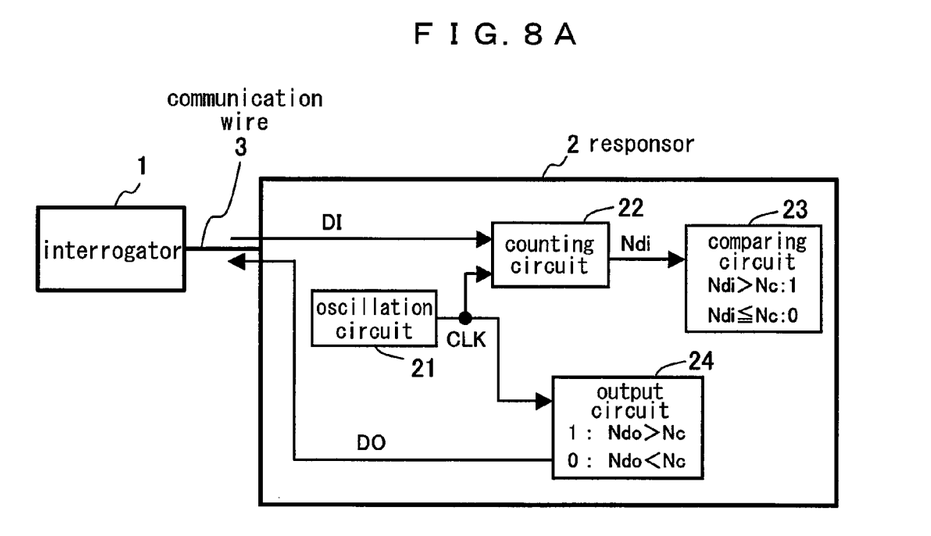
FIG. 8A is a block diagram illustrating a schematic constitution of a conventional communication apparatus.

FIG. 8A shows a schematic constitution of the conventional single-wire data communication system. In the single-wire data communication system, an interrogator 1 and a resonser 2 are connected to each other via a communication wire 3. The interrogator 1 and the responsor 2 are both communication apparatuses. The communication apparatus for the data reception is called a responsor, while the communication apparatus for the data transmission is called an interrogator.

The responsor 2 comprises an oscillation circuit 21, a counting circuit 22, a comparing circuit 23 and an output circuit 24. The oscillation circuit 21 generates a clock CLK. The counting circuit 22 counts Ndi, which is the number of the clocks CLK, corresponding to a pulse interval of a reception signal DI from the responsor 1 (time interval between pulses: shown by, for example, 0 or 1). The comparing circuit 23 compares the clock number Ndi to a judgment value Nc, and judges that the reception data is "0" when the clock number Ndi is at most the judgment value Nc, while judging that the reception data is "1" when the clock number Ndi is larger than the judgment value Nc. The output circuit 24 outputs a transmission signal DO having a pulse interval corresponding to a reference clock number Ndo, and changes a voltage of the communication wire 3, which is originally fixed, in accordance with the pulse interval of the transmission signal DO.

Figure 8B:
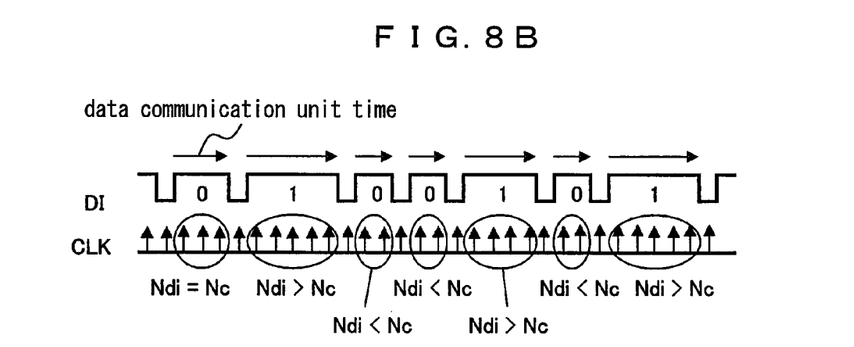
FIG. 8B is a first timing chart of the operation of the conventional communication apparatus.

FIG. 8B shows the operation when data is received. When the data is received, the counting circuit 22 counts the clock number Ndi corresponding to the pulse interval of the reception signal DI. The comparing circuit 23 compares the clock number Ndi to the judgment value Nc, and judges that the reception data is "0" when the clock number Ndi is at most the judgment value Nc, while judging that the reception data is "1" when the clock number Ndi is larger than the judgment value Nc.

Figure 8C:
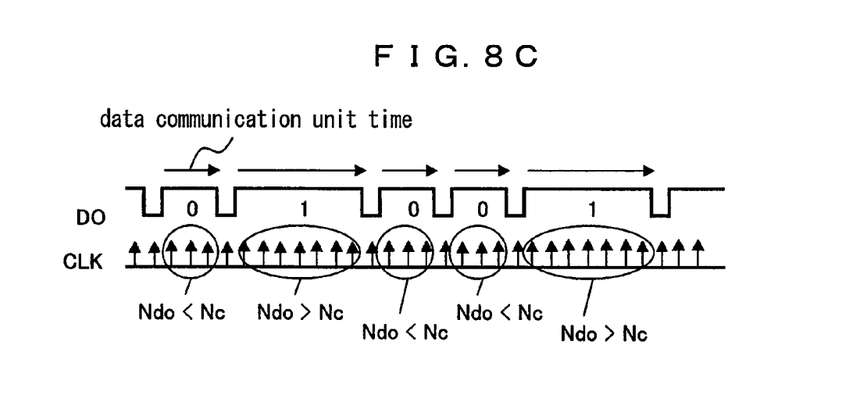
FIG. 8C is a second timing chart of the operation of the conventional communication apparatus.

FIG. 8C shows the operation when data is transmitted. When the data is transmitted, the output circuit 24 sets the voltage of the communication wire 3 at the "L" level when the clock number Ndo reaches the judgment value "3" in the case of the transmission data being "0", while setting the voltage of the communication wire 3 to the "L" level when the clock number Ndo reaches the judgment value "7" in the case of the transmission data being "1". In other words, the pulse interval of the transmission signal DO is changed in accordance with the data value.

Patent Document 1: US2005-0185720

DISCLOSURE OF THE INVENTION

Problems to be Solved by the Invention

In the foregoing conventional technology, a data communication unit time (see horizontal arrows) is different depending on if the reception data or the transmission data is "0" or "1". Therefore, it is necessary to differently control the communication in the responsor depending on if the data is "1" or "1", which makes it difficult to synchronously communicate the data between the interrogator and the responsor.

The present invention was made in order to solve the foregoing problem, and a main object thereof is to realize the data communication synchronizing between the communication apparatuses irrespective of the variability of clocks in the signal-wire data communication system.

Means for Solving the Problem

In order to achieve the foregoing object, the present invention is characterized in that the data communication unit time at the time when the data is "0" and the data communication unit time at the time when the data is "1" are equal to each other and it can be accurately judged if the data is "0" or "1" irrespective of the variability of clocks.

In the case where the data communication is performed in the single-wire communication system based on a constant data communication unit time, the permutation of a communication reference pulse showing the start of the data communication unit time and a data pulse randomly changes momently in a string of pulses chronologically detected in the reception signal. Therefore, it is necessary to accurately discriminate the data pulse from the pulses superposed on the reception signal one after the other.

Therefore, in the present invention, a predetermined upper limit value is provided for a clock count value, and the clock is continuously counted during a period before the time when the count value reaches the predetermined upper limit value irrespective of whether or not the pulse is detected in the reception signal. After the count value reaches the predetermined upper limit value, the predetermined upper limit value is retained until the next pulse is detected. Then, when the next pulse is received, the received pulse is regarded as the communication reference pulse, and the count value is initialized upon the reception of the communication reference pulse. During a period before the time when, the initialized count value reaches the predetermined upper limit value, the data value ("0" or "1") is judged depending on whether or not the pulse is detected in the reception signal. More specifically, the data value is judged to correspond to a long pulse interval when the pulse is not detected (for example, data "1"), while the data value is judged to correspond to a short pulse interval when the pulse is detected (for example, data "0"). After the count value reaches the predetermined upper limit value, the predetermined upper limit value is retained by the time when the next pulse is detected in the reception signal. Therefore, the communication independent from the data value, in which the data rate is constant, can be realized irrespective of the clock variability.

Describing a specific constitution, a communication apparatus according to the present invention is a communication apparatus for performing data communications with another communication apparatus via a single communication wire, comprising:

a clock generator for generating a clock;

a counter for counting the clock and continuously counting the clock during a period before the time when a count value thereby obtained reaches a predetermined upper limit value, the counter further continuously setting the predetermined upper limit value as the count value until a pulse is detected in a reception signal received from the another communication apparatus after the count value reaches the predetermined upper limit value, and initializing the count value when the pulse is detected after the count value reaches the predetermined upper limit value; and a data value judger for judging a data value based on the pulse detected in the reception signal during a period before the time when the count value reaches the predetermined upper limit value. The data value judger preferably judges the data value depending on whether or not the pulse is detected in the reception signal.

In the foregoing constitution, the count value increases one by one because the counter starts to count the clock after the initialization. The count value is given to the data value judger. The count value approaches the predetermined upper limit value over time. The data value judger detects the pulse in the reception signal during a period before the time when the count value reaches the predetermined upper limit value. When the pulse is detected during the period, the data value judger judges that, for example, the data superposed on the reception signal at this timing shows the data value corresponding to the short pulse interval. When the pulse is not detected during the period, the data value judger judges that, for example, the data superposed on the reception signal at this timing shows the data value corresponding to the long pulse interval.

When the pulse is detected in the reception signal after the count value reaches the predetermined upper limit value, the data value judger judges that the detected pulse is the communication reference pulse showing the start of the data communication unit time. The counter initializes the count value and restarts the counting based on the judgment.

The counter does not count up the count value but retains the predetermined upper limit value until the next pulse is detected after the count value reaches the predetermined upper limit value. Therefore, the data value ("0" or "1") can be accurately judged though a time length during which the count value reaches the predetermined upper limit value after the initialization is variable due to the clock variability. When the data value ("0" or "1") is judged, the time length during which the count value reaches the predetermined upper limit value after the initialization is a judgmental standard. Since the predetermined upper limit value is retained by the counter, the time length can have a certain degree of allowed time width, which assures the accuracy in the judgment of the data value irrespective of the clock variability. As a result, the synchronization is obtained in the data communication between the communication apparatuses irrespective of the clock variability and the degree of the variability according to the present invention.

The counter preferably initializes the count value in synchronization with the clock (for example, at the timing of the rising edge). Accordingly, the synchronization can be more accurate in the data communication according to the present invention.

The counter preferably initializes the count value in such a manner that the initialization is asynchronous to the clock. Accordingly, the count value can be initialized even though a width of the pulse superposed on the reception signal is shorter than a cycle of the clock. As a result, the synchronization is obtained in the data communication between the communication apparatuses irrespective of the width of the received pulse.

The communication apparatus further comprises an output unit for outputting a transmission signal to another said communication apparatus, wherein the data value judger registers the count value at the time when the pulse is detected in the reception signal during a period before the time when the count value reaches the predetermined upper limit value as a count set value, and the output unit changes a potential of the transmission signal from a fixed value at the timing by which the count value reaches the predetermined upper limit value when the data value corresponding to the short pulse interval is superposed on the transmission signal, and retains the potential of the transmission signal at the fixed value at any timing when the data value corresponding to the long pulse interval is superposed on the transmission signal.

Accordingly, in the transmission and reception of the data having the data value corresponding to the short pulse interval, a time length from the communication reference pulse to the timing by which the potential of the communication wire is changed can become identical in the transmission and the reception. As a result, the data communication unit time can be maintained at a constant level irrespective of the clock variability, and a data input/output time can be synchronous between the communication apparatuses so that the whole system can be easily controlled.

Further, the communication apparatus preferably further comprises a memory for memorizing the predetermined upper limit value, wherein the counter and the data value judger read the predetermined upper limit value from the memory and set the read value.

Accordingly, the predetermined upper limit value of the counter and the data value judger can be set separately for each of the communication apparatuses. Therefore, the data communication can be performed with respect to a plurality of communication apparatuses in which different data communication unit times are set.

The data value judger preferably halts the detection of the pulse in place of the continuous detection of the pulse and terminates the communication with another said communication apparatus without the detection of the pulse in the reception signal when the count value reaches the predetermined upper limit value.

Accordingly, a time length from the communication reference pulse to the next communication reference pulse is counted so that an upper limit of the data communication unit time is set. When the count value reaches the predetermined upper limit value without the detection of the pulse in the reception signal after the count value is initialized (in other words, when any pulse is not detected within the data communication unit time), the communication is halted based on the judgment that an error is generated. Therefore, the communication with another said communication apparatus which conducts communications beyond the upper limit of the data communication unit time can be restricted.

In the communication apparatus, the counter preferably comprises:

a first counter for initializing the count value when the pulse is detected in the reception signal and retaining the predetermined upper limit value as the count value until the pulse is detected after the count value reaches the predetermined upper limit value; and a second counter for continuously counting the clock until the count value reaches the predetermined upper limit value and continuously setting the predetermined upper limit value as the count value until the pulse is detected after the count value reaches the predetermined upper limit value, the counter further initializing the count value when the pulse is detected after the count value reaches the predetermined upper limit value, wherein the data value judger subtracts a result of the counting by the first counter from a result of the counting by the second counter at a timing by which the count value by the second counter reaches the predetermined upper limit value and judges the data value based on a result of the subtraction. The first counter initializes the count value when the pulse is detected in the reception signal at any timing, in other words, irrespective of if the detected pulse is the data pulse or the communication reference pulse Accordingly, the plurality of time lengths from the communication reference pulse to the input of the data pulse can be set so that multiple-value communication can be performed within the same data communication unit time.

The communication apparatus preferably further comprises a one-shot generator for outputting a constant pulse width signal which is selectively activated during a period before the time when the count value reaches the predetermined upper limit value after the count value is initialized by the counter and selectively inactivated during a period before the time when the count value is initialized after the count value reaches the predetermined upper limit value, wherein the data value judger compares the count value by the counter to the predetermined upper limit value when the constant pulse width signal is in the inactive state, and judges the data value based on result of the comparison. The counter initializes the count value when the pulse is detected in the reception signal irrespective of the timing of the detection, in other words, irrespective of if the detected pulse is the data pulse or the communication reference pulse. Accordingly, the pulse detected in the reception signal during the period when the constant pulse width signal is active is judged to be the data pulse, while the pulse detected in the reception signal during the period when the constant pulse width signal is inactive is judged to be the communication reference pulse.

Accordingly, the synchronization is obtained in the data communication between the communication apparatuses irrespective of the clock variability. Further, the pulse detected when the constant pulse width signal is in the active state is judged to be the data pulse regardless of the timing of the pulse detection, which realizes the data reception based on the constant data communication unit time in the presence of different data patterns.

The communication apparatus preferably further comprises a memory for memorizing at least a count set value, wherein the counter comprises:

a first counter for continuously counting the clock until the count value reaches the predetermined upper limit value and retaining the predetermined upper limit value, as the count value until the pulse is detected after the count value reaches the predetermined upper limit value, the counter further initializing the count value when the pulse is detected after the count value reaches the predetermined upper limit value; and a second counter for counting the pulse and initializing the pulse count upon the initialization of the count value by the first counter, and the data value judger judges the communication data value based on a result of comparison between the pulse number counted by the second counter and the count set value memorized in the memory.

Accordingly, the number of the pulses detected within the data communication unit time is counted, and compared to the count set value memorized in the memory so that the communication data is judged. Therefore, when the count set value of the memory is rewritten, the same communication apparatus can be used for the data reception with respect to another said communication apparatus which performs the communication based on the different number of the data pulses.

Effect of the Invention

According to the present invention, the synchronization is obtained in the data communication between the communication apparatuses irrespective of the clock variability.

DESCRIPTION OF REFERENCE SYMBOLS 1 interrogator (communication apparatus)
2 responsor (communication apparatus)
3 communication wire
11 clock generator
12 counter
12a first counter
12b second counter
13 data value judger
14 output unit
15 memory (non-volatile memory)
16 one-shot generator
C comparison result
CLK clock
DI reception signal
DO transmission signal
Dn count set value
Ns, Nd count value
Ndi the number of clocks corresponding to pulse interval of reception signal
Ndo count value for determining pulse interval of transmission signal
Nmax predetermined upper limit value
Nr count set value
Np number of received pulses
Nc judgment value
Ps communication reference pulse
Pd data pulse
R judgment data value
S constant pulse width signal

PREFERRED EMBODIMENTS OF THE INVENTION

Hereinafter, a communication apparatus in a single-wire communication system according to the present invention is described in detail referring to the drawings.

Preferred Embodiment 1

Figure 1A:
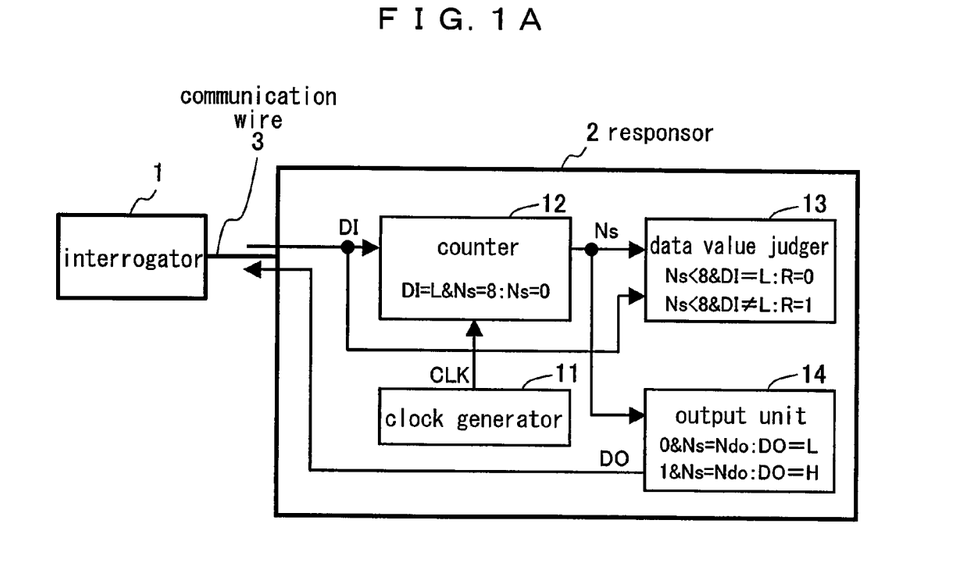
FIG. 1A is a block diagram illustrating a schematic constitution of a communication apparatus according to a preferred embodiment 1 of the present invention.

FIG. 1A is a block diagram illustrating a schematic constitution of a single-wire data communication system according to a preferred embodiment 1 of the present invention. The present system comprises an interrogator 1 and a responsor 2, wherein the interrogator 1 and the responsor 2 are connected to each other via a communication wire 3. The responsor 2 comprises a clock generator 11, a counter 12, a data value judger 13 and an output unit 14. In the drawing, DI denotes a reception signal from the interrogator 1 received by the responsor 2, DO denotes a transmission signal transmitted from the responsor 2 to the interrogator 1, CLK denotes a clock signal, Ps denotes a communication reference pulse included in the reception signal DI, and Pd denotes a data pulse included in the reception signal DI. The communication reference pulse Ps is a pulse repeatedly superposed on the reception signal DI at each data communication unit time. The data pulse Pd is a pulse superposed on the reception signal DI apart from the communication reference pulse Ps.

The pulse is identified as the pulse Ps or the plus Pd by the responsor 2 depending on a position where it is superposed within the data communication unit time.

Figure 2A:
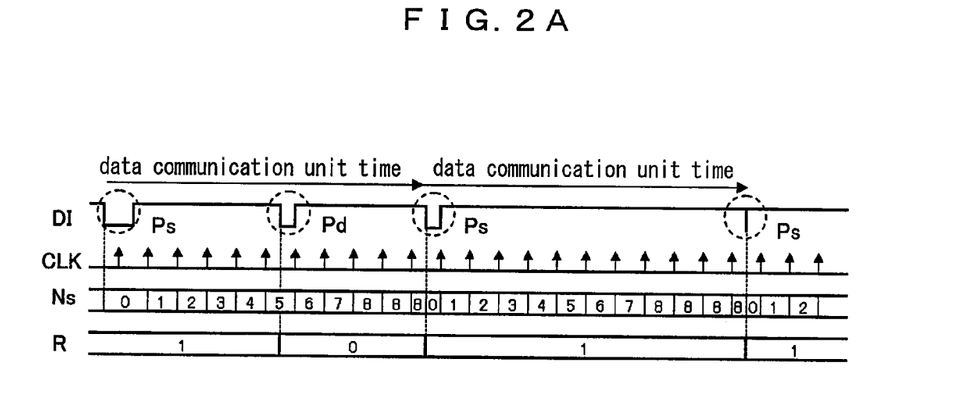
FIG. 2A is a first timing chart of the operation of a communication apparatus according to preferred embodiments 2 and 3 of the present invention.
Figure 2B:
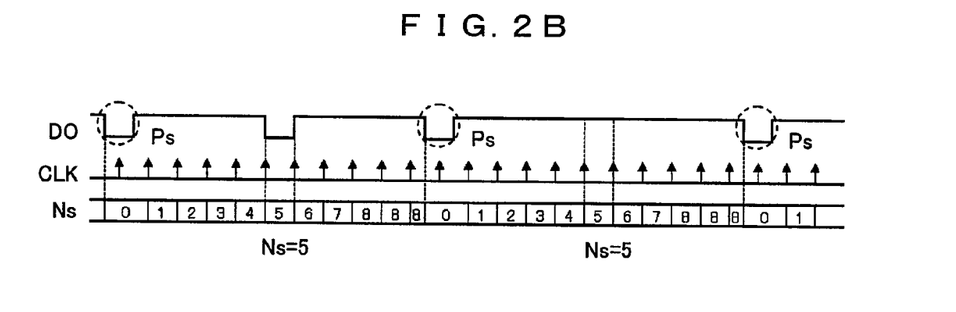
FIG. 2B is a second timing chart of the operation of the communication apparatus according to the preferred embodiments 2 and 3.
Figure 2C:
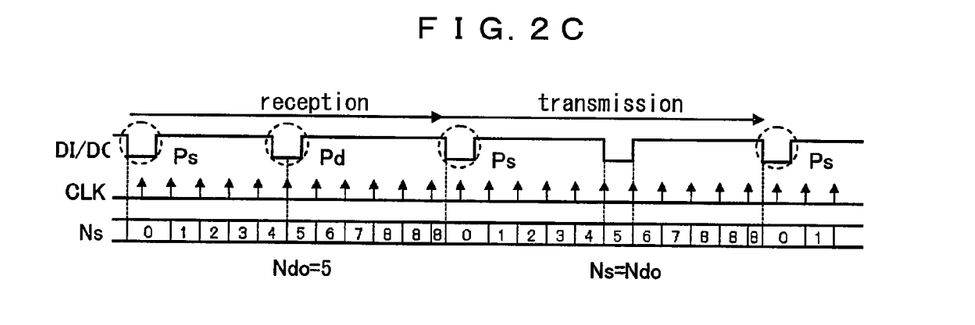
FIG. 2C is a third timing chart of the operation of the communication apparatus according to the preferred embodiments 2 and 3.

The clock generator 11 generates the clock CLK. The counter 12 counts the clock CLK generated by the clock generator 11. More specifically, the counter 12:

continues to count the clock CLK during a period before the time when a count value Ns of the clock CLK (hereinafter, referred to as count value) reaches a predetermined upper limit value Nmax (in FIG. 2, an example of the predetermined upper limit value, "8", is shown) after the count is initialized;

retains the predetermined upper limit value, "8", during a period before the time when the next pulse (communication reference pulse Ps) is detected in the reception signal DI after the count value Ns reaches the predetermined upper limit value Nmax, "8"; and upon the detection of the next pulse after the count value Ns reaches the predetermined upper limit value Nmax, "8", regards the detected pulse as the communication reference pulse Ps, and initializes the count value Ns at the rising edge of the clock CLK based on the pulse detection result.

The predetermined upper limit value is set at a value smaller than the count value of the clock CLK in the data communication unit time (hereinafter, referred to as unit time count value) (predetermined upper limit value<unit time count value). In an example shown in FIG. 1B, wherein the unit time count value is set at "10" showing the total count number of the clock CLK, "11", and, therefore, the predetermined upper limit value Nmax is set at "8" smaller than the unit time count value "10".

The data value judger 13 detects the presence or absence of the data pulse Pd at the timing of the rising edge of each clock CLK during a period before the time when the count value Ns reaches the predetermined upper limit value Nmax "8". The data value judger 13 then judges a judgment data value R based on the count value Ns at the timing of the detection of the data pulse Pd. The data value judger 13 memorizes the judgment data value R as the communication data.

The output unit 14 registers the count value Ns at the timing of the detection of the data pulse Pd as a count set value Ndo during a period before the time when the count value Ns counted by the counter 12 reaches the predetermined upper limit value Nmax, "8". Then, the output unit 14 changes a potential of the transmission signal DO from its fixed value, which is "H" level, to the "L" level at the timing by which the count value Ns reaches the count set value Ndo when the data value corresponding to a short pulse interval (for example, data "0") is transmitted. The output unit 14 outputs the transmission signal DO which is retained at the fixed value, "H" level, without changing the potential of the transmission signal DO at the timing by which the count value Ns reaches the count set value Ndo when the data value corresponding to a long pulse interval (for example, data "1") is transmitted.

Figure 1B:
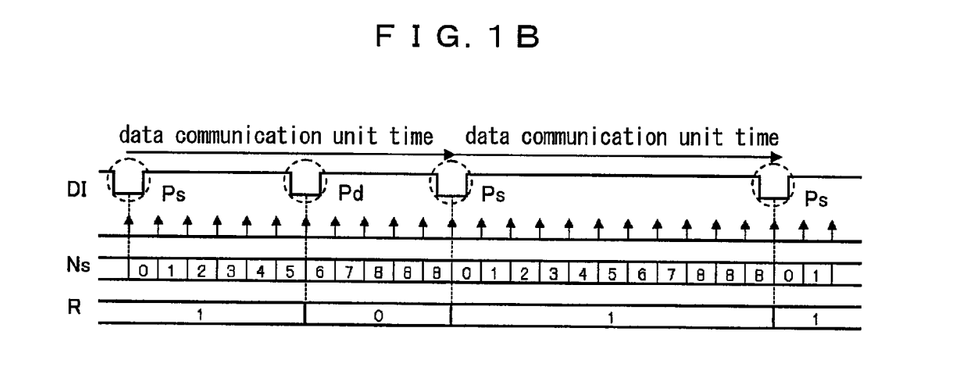
FIG. 1B is a timing chart of the operation of the communication apparatus according to the preferred embodiment 1.

Next, the operation of the data reception in the data communication apparatus according to the present preferred embodiment thus constituted is described referring to a timing chart shown in FIG. 1B. In FIG. 1B, the reception signal DI (potential of the communication wire 3), clock CLK, count value Ns by the counter 12, and judgment data value R by the data value judger 13 are shown.

The counter 12 starts (restarts) to count the clock CLK outputted from the clock generator 11 after the count is initialized. The count value Ns starts from "0", and increases to "1", "2", "3", "4", "5", "6" and "7". When the count value Ns finally reaches the predetermined upper limit value Nmax, "8", the predetermined upper limit value Nmax "8" is thereafter retained until the pulse (communication reference pulse Ps) is detected in the reception signal DI. More specifically, the counter 12 continuously retains "8", "8", . . . , that is the predetermined upper limit value Nmax, "8", as the output count value Ns though the rising edge of the clock CLK is sequentially detected after the count value Ns reaches the predetermined upper limit value Nmax, "8". Then, when the pulse is detected for the first time after the count value Ns reaches the predetermined upper limit value Nmax, "8", the counter 12 regards the detected pulse as the communication reference pulse Ps, and reinitializes the count value Ns based on the pulse detection result.

Below is given a description on the recognition of the pulse superposed on the reception signal DI. The counter 12 detects the presence or absence of the pulse in the reception signal DI at the rising edge of each clock CLK. When the pulse is detected in the reception signal DI during a period before the time when the count value Ns reaches the predetermined upper limit value Nmax, "8", the counter 12 recognizes the detected pulse as the data pulse Pd. For example, the pulse detected in the reception signal DI at the timing by which the count value Ns is "5" is recognized as the data pulse Pd. When the pulse is detected in the reception signal DI at a timing after the count value Ns reaches the predetermined upper limit value Nmax, "8", the counter 12 recognizes the detected pulse as the communication reference pulse Ps showing the start (end) of the data communication unit time and initializes the count value Ns. The count value Ns counted by the counter 12 is given to the data value judger 13 and the output unit 14.

The data value judger 13 judges whether or not the pulse (recognized as the data pulse Pd) is detected in the reception signal DI at the timing of the rise of each clock CLK during a period before the time when the count value Ns reaches the predetermined upper limit value Nmax, "8". In the case where the pulse is detected in the reception signal DI during the period, the data value judger 13 judges that the judgment data value R shown as a result of the pulse detection is the data value corresponding to the short pulse interval (data "0" in this example). This corresponds to such processing in the conventional technology that the number of the clocks CLK corresponding to the pulse interval of the reception signal DI is counted as the count value Ns and the value is judged to be data "0" when the count value Ns is shorter than a predetermined pulse interval.

On the other hand, in the case where the pulse is not detected in the reception signal DI during the period, the data value judger 13 judges that the judgment data value R shown as a result of the pulse detection is the data value corresponding to the long pulse interval (data "1" in this example). This corresponds to such processing in the conventional technology that the number of the clocks CLK corresponding to the pulse interval of the reception signal DI is counted as the count value Ns and the value is judged to be data "1" when the count value Ns is longer than the predetermined pulse interval.

The data value judger 13 memorizes the judgment data value R thus judged as the communication data. When the pulse is detected in the reception signal DI after the count value Ns reaches the predetermined upper limit value Nmax, "8", the counter 12 judges that the communication reference pulse is detected, and then, initializes the count value Ns and restarts the count.

The control operation thus described is more specifically described. When the count value Ns is initialized by the counter 12, the data value judger 13 sets the judgment data value R at "1" in principle. Then, during the counting by the counter 12, the judgment data value R is switched to "0" when the voltage level of the reception signal DI is shifted to the "L" level. When the next pulse is detected in the reception signal DI after the elapse of the data communication unit time, (when the voltage level of the reception signal DI is shifted to the "L" level), the data value judger 13 switches the judgment data value R to "1". As described, in the single-wire data communication system according to the present preferred embodiment, the predetermined upper limit value Nmax, "8", is retained until the next pulse (communication reference pulse Ps) is detected in the reception signal DI after the count value Ns reaches the predetermined upper limit value Nmax, "8". Therefore, though the time length for the initialized count value Ns to reach the predetermined upper limit value Nmax, "8", is variable due to the variability of the clock CLK, the data value ("0", "1") can be accurately judged. More specifically, in the present preferred embodiment, the time length for the count value Ns to reaches the predetermined upper limit value Nmax, "8", after the initialization is the judgmental standard. Because the predetermined upper limit value Nmax, "8", is retained by the counter 12, a certain degree of allowed time width is set in the time length. Therefore, the data value can be accurately judged irrespective of the variability of the clock CLK.

In the present preferred embodiment, in the case where the pulse is detected in the reception signal. DI in the state where the count value Ns retains the predetermined upper limit value Nmax, "8", when the reception signal DI is received, the detected pulse is regarded as the communication reference pulse Ps showing the start of the data communication unit time. Accordingly, though the data value is changed while the single-wire data communication is being performed based on the constant data communication unit time, the accuracy in the judgment of the data value can be maintained, and the communication based on the constant data rate can be realized without relying on the data value. As a result, according to the present preferred embodiment, the data communication in which the synchronization is obtained between the interrogator 1 and the responsor 2 can be realized regardless of the presence or absence and the degree of the clock variability.

Further, the counter 12 initializes the count value Ns based on the detection of the pulse in the reception signal DI made after the count value Ns reaches the predetermined upper limit value Nmax, "8", in synchronization with the timing of the rise of the clock CLK. Therefore, in the data communication in which the synchronization is obtained between the interrogator 1 and the responsor 2, the synchronization can be very accurate.

Preferred Embodiment 2

In a preferred embodiment 2 of the present invention, the constitution shown in FIG. 1A according to the preferred embodiment 1 is adopted. FIG. 2A is a timing chart of the operation performed when the data is received according to the preferred embodiment 2. In the preferred embodiment 1, the counter 12 initializes the count value Ns based on the pulse (communication reference pulse Ps) detected in the reception signal DI after the count value Ns reaches the predetermined upper limit value Nmax, "8". In contrast, the count value Ns is initialized at such a timing that that the initialization is asynchronous to the clock CLK. Below is described the characteristic of the present preferred embodiment.

The counter 12 according to the present preferred embodiment initializes the count value Ns immediately after the detection of the pulse (communication reference pulse Ps) in the reception signal DI after the count value Ns reaches the predetermined upper limit value Nmax. When the pulse is detected in the reception signal DI during a period before the time when the count value Ns reaches the predetermined upper limit value Nmax, "8", the data value judger 13 according to the present preferred embodiment recognizes the detected pulse as the data pulse Pd in a manner similar to the preferred embodiment 1, and further judges the data value without bringing it into sync with the clock CLK generated by the clock generator 11. More specifically, when the pulse is detected in the reception signal DI, the judgment value R is immediately changed without the synchronization with the clock CLK.

FIG. 2B is a timing chart of the operation performed when the data is transmitted according to the preferred embodiment 2. At the timing by which the count result by the counter 12 (count value Ns) becomes equal to the count set value Ndo (Ndo=5) (Ns=Ndo), the output unit 14 changes the voltage level of the transmission signal DO from "1" which is a fixed value to "0" in the case where the transmission data is "0", while retaining the voltage level to the fixed value, "1", in the case where the transmission data is "1". The description of the rest of the operation, which is similar to that of the preferred embodiment 1, is omitted.

As described, in the single-wire data communication system according to the present preferred embodiment, the count value Ns is initialized by the counter 12 when the data is received in such a manner that the initialization is asynchronous to the clock CLK. Therefore, the count value Ns is initialized at the timing of the fall of the data pulse Pd. Accordingly, the count value Ns can be initialized though a width of the pulse superposed on the reception signal DI (time width of the "L" level of a low-active pulse) is shorter than a cycle of the clock CLK. In other words, the data can be received in the synchronous manner between the interrogator 1 and the responsor 2 can be realized regardless of the width of the pulse superposed on the reception signal DI.

The count value Ns counted based on the communication reference pulse Ps received by the responsor 2 at the time when the data is received is registered as the count set value Ndo, and the responsor 2 at the time when the data is transmitted controls the voltage level of the transmission signal DO at the timing by which the count value Ns is equal to the count set value Ndo. Therefore, the responsor 2 can transmit the data in synchronization with the interrogator 1 irrespective of the variability of the clock CLK.

Preferred Embodiment 3

In a preferred embodiment 3 of the present invention, the constitution shown in FIG. 1A according to the preferred embodiment is adopted. FIG. 2C is a timing chart of the operation performed when the data is transmitted and received according to the preferred embodiment 3. A transmission/reception signal DI/DO is shown.

In the case where the pulse is detected in the reception signal DI during a period before the time when the count value Ns by the counter 12 reaches the predetermined upper limit value Nmax "8" when the data is received, the output unit 14 registers the count value Ns at the timing of the detection as the count set value Ndo ("5" in this example). Further, the output unit 14 changes the voltage level of the transmission signal DO from the fixed value, which is "1", to "0" in the case where the transmission data is "0" at the timing by which the count result of the counter 12 (count value Ns) becomes equal to the count set value Ndo (Ndo=5) (Ns=Ndo), while retaining the voltage level at the fixed value, "1", in the case where the transmission data is "1". The description of the rest of the operation and the constitution, which are similar to those of the preferred embodiment 1, is omitted.

As described, according to the present preferred embodiment, the count value from the output of the communication reference pulse Ps to the output of the data pulse Pd at the time when the data is transmitted is made to be equal to the count value Ns from the detection of the communication reference pulse Ps to the detection of the data pulse Pd at the time when the data is received. Accordingly, the time length from the output of the communication reference pulse Ps to the output of the data pulse Pd at the time when the data is transmitted is made to be equal to the time length from the detection of the communication reference pulse Ps to the detection of the data pulse Pd at the time when the data is received. As a result, the data communication unit time can be constantly retained irrespective of the clock variability, and the data input/output time can be synchronous in the interrogator 1 and the responsor 2, which facilitates the control of the whole system.

Preferred Embodiment 4

Figure 3A:
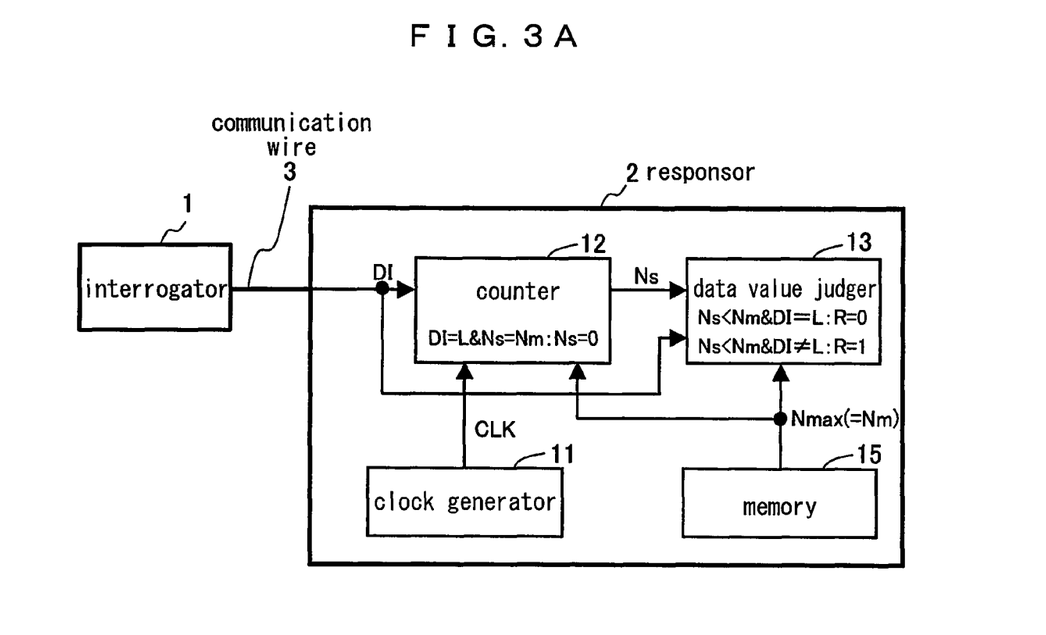
FIG. 3A is a block diagram illustrating a schematic constitution of a communication apparatus according to a preferred embodiment 4 of the present invention.

FIG. 3A is a block diagram illustrating a schematic constitution of a single-wire data communication system according to a preferred embodiment 4 of the present invention. In the present preferred embodiment, the responsor 2 further comprises a memory (non-volatile memory) 15 in which the predetermined upper limit value Nmax is memorized in the constitution according to the preferred embodiment 1. The output unit 14, though provided, is not shown. The rest of the components, which are similar to those of the preferred embodiment 1, are provided with the same reference symbols, and are not described again.

Figure 3B:
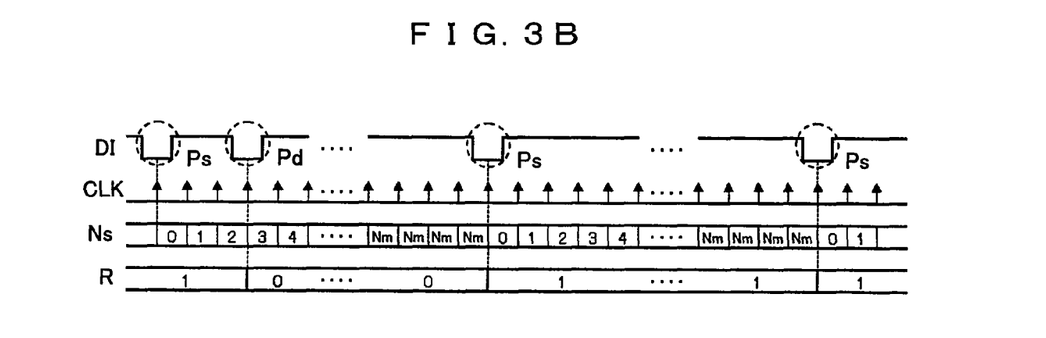
FIG. 3B is a timing chart of the operation of the communication apparatus according to the preferred embodiment 4.

Next, the operation of the data reception in the single-wire data communication system according to the present preferred embodiment thus constituted is described referring to a timing chart shown in FIG. 3B.

The counter 12 and the data value judger 13 set the predetermined upper limit value Nmax memorized in the memory 15. The counter 12 counts the clock CLK generated by the clock generator 11, and outputs the count value Ns thereby obtained. The counter 12 starts (restarts) the count of the clock CLK after the initialization. The count value Ns starts from "0" and increases to "1", "2", ..., and finally reaches the predetermined upper limit value Nmax (shown by Nm in FIGS. 3A and 3B due to an allowed rendering space). Thereafter, the predetermined upper limit value Nmax is retained as Nmax, Namx, ..., until the next pulse (communication reference pulse Ps) is detected in the reception signal DI. When the pulse is first detected in the reception signal DI after the count value Ns reaches the predetermined upper limit value Nmax, the counter 12 recognizes the detected pulse as the communication reference pulse Ps and reinitializes the count value Ns based on the recognition result. Upon the detection of the pulse in the reception signal DI during a period before the time when the count value Ns reaches the predetermined upper limit value Nmax, the counter 12 recognizes the detected pulse as the data pulse Pd. In the case where when the pulse is detected in the reception signal DI during a period before the time when the count value Ns reaches the predetermined upper limit value Nmax and the count value Ns is "2" (2<Nmax), for example, the counter 12 recognizes the received pulse as the data pulse Pd. Further, upon the detection of the pulse in the reception signal DI after the count value Ns reaches the predetermined upper limit value Nmax, the counter 12 recognizes the detected pulse as the communication reference pulse Ps showing the start of the data communication unit time at the rising edge of the clock CLK immediately thereafter, and initializes the count value Ns based on the recognition result. The counting result by the counter 12 (count value Ns) is given to the data value judger 13.

The data value judger 13 judges whether or not the pulse, that is, the data pulse Pd, is detected in the reception signal DI at the riding edge of each clock CLK during a period before the time when the count value Ns reaches the predetermined upper limit value Nmax. When the data pulse Pd is detected during the period, it is judged that the judgment data value R in the reception signal DI at this timing of the detection is the data value corresponding to the short pulse interval (data "0" in this example). This is equivalent to such processing that the number of the clocks CLK corresponding to the pulse interval of the reception signal DI is counted as the count value Ns, and the data superposed on the reception signal DI at this relevant timing is judged to be "0" because the count value Ns is shorter than the predetermined pulse interval (defined by the predetermined upper limit value Nmax). When the data Pd is detected during a period before the time when the count value Ns reaches the predetermined upper limit value Nmax, the data judgment value R in the reception signal DI at this timing of the detection is judged to be the data value corresponding to the long pulse interval (data "1" in this example). This is equivalent to such processing that the data superposed on the reception signal DI at this timing is judged to be "1" because the count value Ns is longer than the predetermined pulse interval. The judgment data value R thus judged is memorized in the data value judger 13 as the communication data.

Next is described a case where the responsor 2 is connected to a plurality of interrogators 1 via the communication wire 3, and the data communication unit time is different to each other in the plurality of interrogators 1. It is assumed that the data communication unit time is differently set in each of the interrogators 1 based on the predetermined upper limit value Nmax set therein. For example, "8" is set in the first interrogator 1 as the data communication unit time, "7" is set in the second interrogator 1 as the data communication unit time, and "6" is set in the third interrogator 1 as the data communication unit time.

When the responsor 2 communicates data with the first interrogator 1 under the foregoing conditions, "8" is set in the memory 15 of the responsor 2 as the predetermined upper limit value Nmax. When the responsor 2 communicates data with the second interrogator 1, "7" is set in the memory 15 as the predetermined upper limit value Nmax. When the responsor 2 communicates data with the third interrogator 1, "6" is set in the memory 15 as the predetermined upper limit value Nmax. In order to exercise the foregoing control, the predetermined upper limit values Nmax of the respective interrogators 1 are memorized in the memory 15 and every time the interrogator 1 to be communicated with is decided, the predetermined upper limit value Nmax of the decided interrogator 1 is read from the memory 15 and used.

The description of the rest of the operation, which is similar to that of the preferred embodiment 1, is omitted.

As described, according to the present preferred embodiment, the predetermined upper limit value Nmax by the counter 12 can be separately set for each responsor 2. Therefore, the single responsor 2 can communicate the data with the plurality of interrogators 1 for which the different data communication unit times are set.

Preferred Embodiment 5

Figure 4A:
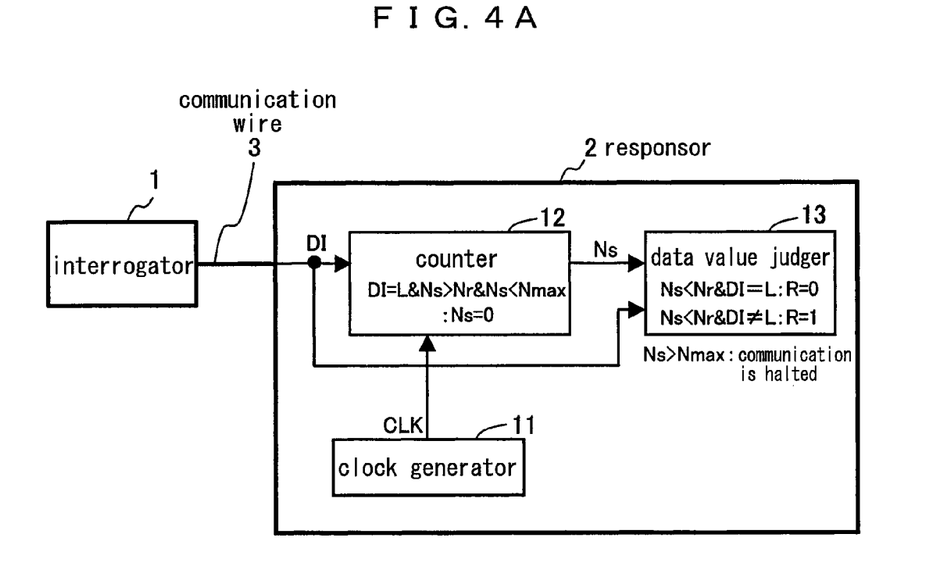
FIG. 4A is a block diagram illustrating a schematic constitution of a communication apparatus according to a preferred embodiment 5 of the present invention.

FIG. 4A is a block diagram illustrating a schematic constitution of a single-wire data communication system according to a preferred embodiment 5 of the present invention. The responsor 2 is connected to the interrogator 1 via the communication wire 3. The responsor 2 comprises the clock generator 11, counter 12 and data value judger 13. The output unit 14, though provided, is not shown in FIG. 4A.

The counter 12 counts the clock CLK generated by the clock generator 11 and outputs the count value Ns thereby obtained. The count value Ns corresponds to the pulse interval of the reception signal DI. A count set value Nr is memorized in the data value judger 13 in advance, and the data value judger 13 compares the count value Ns supplied from the counter 12 to the count set value Nr memorized therein at the timing of the detection of the pulse in the reception signal DI. Then, when the count value Ns at that timing is judged to be smaller than the count set value Nr, the data value judger 13 judges that the detected pulse is the data pulse Pd, and decides the judgment data value R based on the judgment (detection) result of the data pulse Pd. The rest of the constitution, which is similar to that of the preferred embodiment 1, is not described.

Figure 4B:
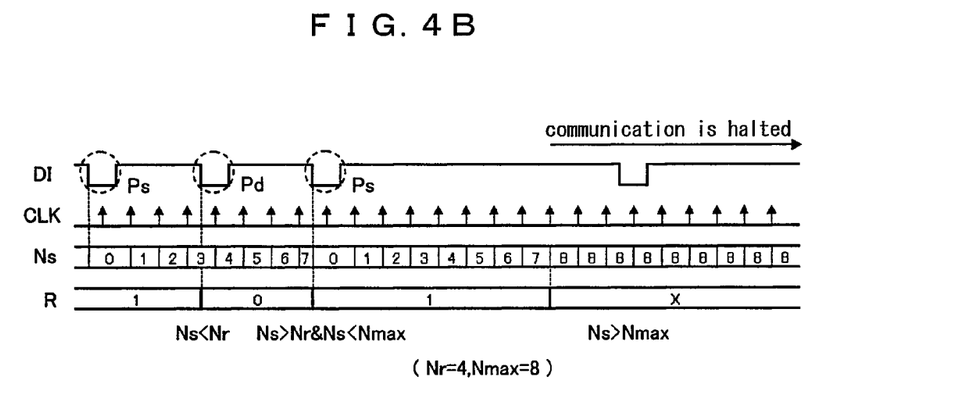
FIG. 4B is a timing chart of the operation of the communication apparatus according to the preferred embodiment 5.

Next, the operation of the data reception in the communication system according to the present preferred embodiment thus constituted is described referring to a timing chart shown in FIG. 4B.

The counter 12 starts (restarts) to count the clock CLK from the clock generator 11 after the initialization, and outputs the count value Ns thereby obtained. The count value Ns starts from "0", and increases to "1", "2", . . . , and finally reaches the predetermined upper limit value Nmax, "8", in principle, and the predetermined upper limit value Nmax is thereafter retained as "8", "8", . . . . In the presence of the received pulse during a period before the time when the count value Ns reaches the count set value Nr, "4", the counter 12 recognizes the received pulse as the data pulse Pd. For example, the received pulse at the time when the count value Ns is "3" is recognized as the data pulse Pd. Further, in the case where there is a received pulse during the period when the count value Ns is larger than the count set value Nr, "4", and smaller than the predetermined upper limit value Nmax, "8", the counter 12 recognizes the received pulse as the communication reference pulse Ps and initializes the count value Ns.

Further, in the case where the pulse is not detected in the reception signal DI during a period before the time when the count value Ns reaches the predetermined upper limit value Nmax, "8", and the pulse is detected after the count value Ns reaches the predetermined upper limit value Nmax, "8", the counter 12 judges that an error of exceeding the data communication unit time occurs during the communication, and halts the communication.

When the pulse (data pulse Pd) is detected in the reception signal DI during the period when the count value Ns is smaller than the count set value Nr, "4", the data value judger 13 judges that the received data indicated by the detected data pulse Pd shows the data value corresponding to the short pulse interval, and sets the judgment data value R at the value corresponding to the received data value according to the judgment (data "0" in this example). This is equivalent to such processing that the number of the clocks CLK corresponding to the pulse interval of the reception signal DI is counted as the count value Ns and the count value Ns is compared to the predetermined pulse interval, and the received data value is judged as "0" when comparison result shows that the count value Ns is shorter than the predetermined pulse interval. When the pulse (data pulse Pd) is not detected in the reception signal DI during the period when the count value Ns is smaller than the count set value Nr, "4", the data value judger 13 judges that the received data indicated by the data pulse Pd shows the data value corresponding to the long pulse interval, and sets the judgment data value R at the value corresponding to the received data value according to the judgment (data "1" in this example). The judgment data value R thus set is memorized in the data value judger 13 as the communication data.

As described, according to the present preferred embodiment, the synchronization is obtained in the data communication between the interrogator 1 and the responsor 2 irrespective of the clock variability. The responsor 2 counts the time length from the communication reference pulse Ps to the next communication reference pulse Ps, and halts the communication based on the judgment that the error occurs when the received pulse (communication reference pulse Ps) is not inputted though the count value Ns reaches the predetermined upper limit value Nmax, "8". This corresponds to the setting of an upper limit with respect to the data communication unit time, and the use of the interrogator 1 which performs the communication beyond the upper limit of the data communication unit time can be restricted.

Preferred Embodiment 6

Figure 5A:
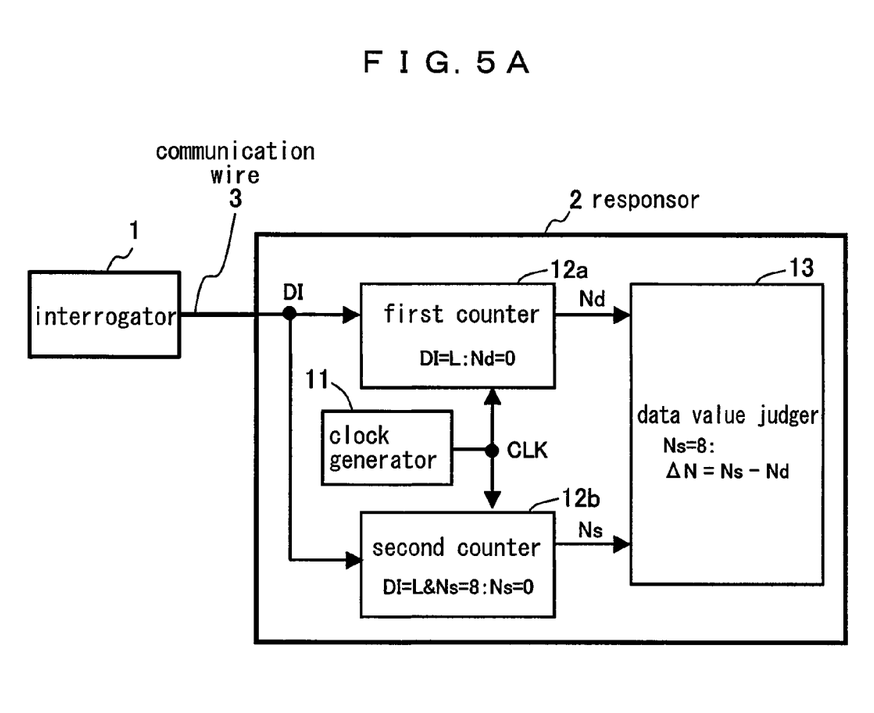
FIG. 5A is a block diagram illustrating a schematic constitution of a communication apparatus according to a preferred embodiment 6 of the present invention.

FIG. 5A is a block diagram illustrating a schematic constitution of a single-wire data communication system according to a preferred embodiment 6 of the present invention. The responsor 2 and the interrogator 1 are connected to each other via the communication wire 3. The responsor 2 comprises the clock generator 11, a first counter 12a, a second counter 12b, and the data value judger 13. The output unit 14, though provided, is not shown in FIG. 5A.

The clock generator 11 generates the clock CLK corresponding to the pulse interval of the reception signal DI. The first counter 12a counts the clock CLK generated by the clock generator 11 and outputs a count value Nd thereby obtained. When the first counter 12a detects the pulse in the reception signal DI (data pulse Pd or communication reference pulse Ps), the count value Nd is initialized. The timing of the initialization is asynchronous to the clock CLK. After the initialization, the first counter 12a starts (restarts) the count of the clock CLK. The count value Nd starts from "0", and increases to "1", "2", . . . , and finally reaches the predetermined upper limit value Nmax, "8". The predetermined upper limit value Nmax is thereafter retained as "8", "8", . . . , until the next pulse (communication reference pulse Ps) is detected in the reception signal DI. When the pulse (communication reference pulse Ps) is detected in the reception signal DI after the count value Nd reaches the predetermined upper limit value Nmax, "8", the count value Nd is reinitialized. The count value Nd counted by the first counter 12a is given to the data value judger 13.

The second counter 12b counts the clock CLK generated by the clock generator 11 and outputs the count value Ns thereby obtained. When the pulse (communication reference pulse Ps) is detected in the reception signal DI after the count value Ns reaches the predetermined upper limit value Nmax, "8", the count value Ns is initialized in the second counter 12b. The timing of the initialization is asynchronous to the clock CLK. After the initialization, the second counter 12b starts (restarts) the count of the clock CLK. The count value Ns starts from "0", and increases to "1", "2", . . . , and finally reaches the predetermined upper limit value Nmax, "8". The predetermined upper limit value Nmax is thereafter retained as "8", "8", . . . , until the next pulse (communication reference pulse Ps) is detected in the reception signal DI. The count value Ns is continuous as "8", "8", . . . . When the pulse (communication reference pulse Ps) is detected in the reception signal DI after the count value Ns reaches the predetermined upper limit value Nmax, "8", the count value Ns is reinitialized. The count value Ns counted by the second counter 12b is given to the data value judger 13.

Figure 5B:
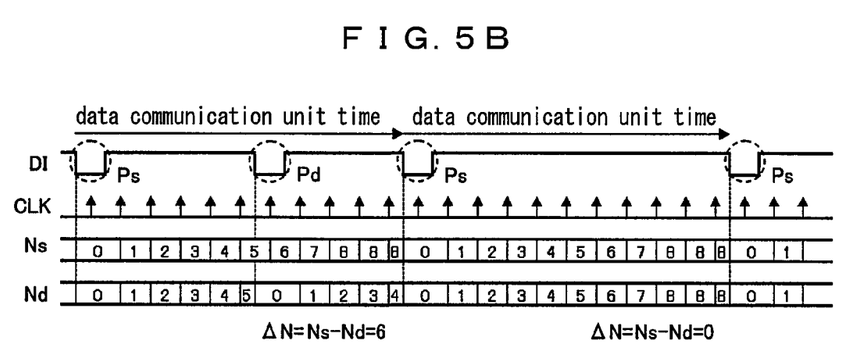
FIG. 5B is a timing chart of the operation of the communication apparatus according to the preferred embodiment 6.

Next, the operation performed when the data is received in the single-wire data communication system according to the present preferred embodiment thus constituted is described referring to a timing chart shown in FIG. 5B.

In the data reception, the first counter 12a counts the cock CLK and outputs the count value Nd thereby obtained. The first counter 12a retains the count value Nd as the predetermined upper limit value Nmax, "8", until the next pulse (communication reference pulse Ps) is detected in the reception signal DI when the count value Nd reaches the predetermined upper limit value Nmax, "8".

The second counter 12b counts the cock CLK and outputs the count value Ns thereby obtained. When the pulse is detected in the reception signal DI during a period before the time when the count value Ns reaches the predetermined upper limit value Nmax, "8", the second counter 12b recognizes the detected pulse as the data pulse Pd, and continues to count the count value Ns. When the pulse is detected in the reception signal DI during the period over which the count value Ns shows the predetermined upper limit value Nmax, "8", the second counter 12b recognizes the detected pulse as the communication reference pulse Ps and initializes the count value Ns based on the recognition result. The second counter 12b retains the count value Ns as the predetermined upper limit value Nmax, "8", until the next pulse (communication reference pulse Ps) is detected in the reception signal DI when the count value Ns reaches the predetermined upper limit value Nmax, "8".

The data value judger 13 calculates a count value differential $\Delta N$ (=Ns−Nd) when the count value Ns by the second counter 12b reaches the predetermined upper limit value Nmax, "8", and defines the calculation result as the communication data value. For example, the communication data value is "2" when the count value Ns="8" and the count value Nd="6", and the communication data value is "0" when the count value Ns="8" and the count value Nd="8". As other examples, the communication data value is "7" when Ns="8" and Nd="1", the communication data value is "6" when Ns="8" and Nd="2", the communication data value is "5" when Ns="8" and Nd="3", the communication data value is "4" when Ns="8" and Nd="4", the communication data value is "3" when Ns="8" and Nd="5", and the communication data value is "1" when Ns="8" and Nd="7".

As described, in the single-wire data communication system according to the present preferred embodiment, the synchronization is obtained in the data communication between the interrogator 1 and the responsor 2 irrespective of the clock variability. Further, the count value differential $\Delta N$ (=Ns−Nd) is calculated when the count value Ns of one side reaches the predetermined upper limit value Nmax, "8", in the data reception, and the calculation result is defined as the communication data value, so that a plurality of time lengths from the communication pulse Ps to the data pulse Pd can be set. As a result, a multiple-value communication can be realized within the single data communication unit time.

Preferred Embodiment 7

Figure 6A:
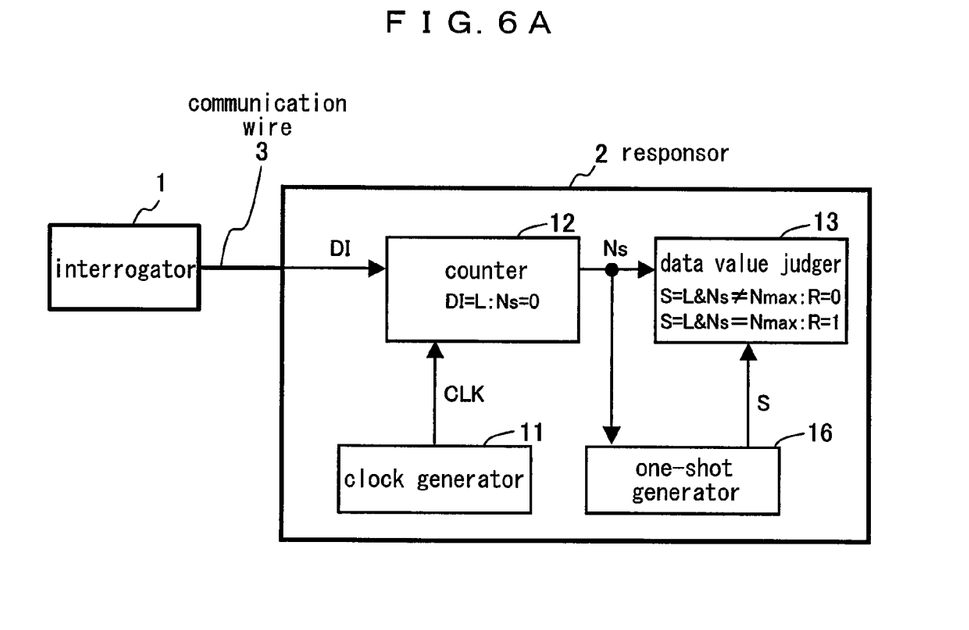
FIG. 6A is a block diagram illustrating a schematic constitution of a communication apparatus according to a preferred embodiment 7 of the present invention.
Figure 6B:
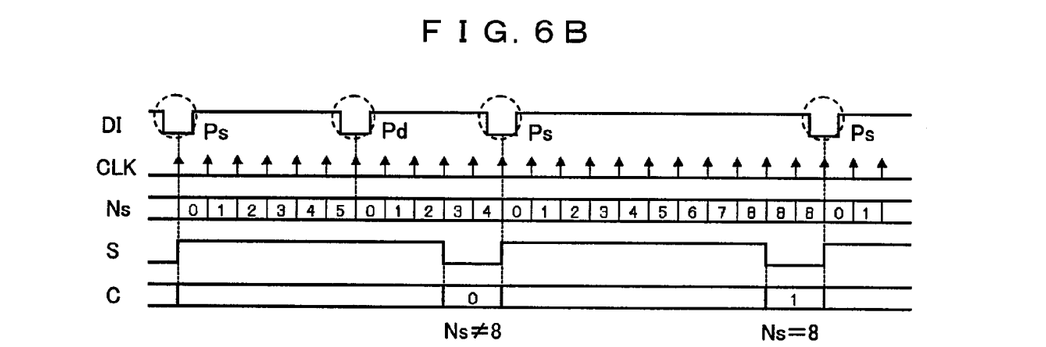
FIG. 6B is a timing chart of the operation of the communication apparatus according to the preferred embodiment 7.

FIG. 6A is a block diagram illustrating a schematic constitution of a single-wire data communication system according to a preferred embodiment 7 of the present invention. FIG. 6B is a timing chart illustrating the operation performed when the data is received according to the preferred embodiment 7. The responsor 2 and the interrogator 1 are connected to each other via the communication wire 3. The responsor 2 comprises the clock generator 11, counter 12, data value judger 13, and a one-shot generator 16.

The counter 12 counts the clock CLK generated by the clock generator 11 and outputs the count value Ns thereby obtained. After the initialization, the counter 12 continues to count the clock CLK until the pulse is detected in the reception signal DI, and initializes the count value Ns when the pulse (data pulse Pd or communication reference pulse Ps) is detected in the reception signal DI. After the count value Ns thus generated reaches the predetermined upper limit value Nmax (for example, "8"), the counter 12 retains the predetermined upper limit value Nmax until the next pulse (communication reference pulse Ps in this case) is detected in the reception signal DI. The period defined by the predetermined upper limit value Nmax is configured to be slightly shorter than the communication reference period defined by the output interval of the communication reference pulse Ps. In an example shown in FIG. 6B, the communication reference period is "11" in terms of the output number of the clock CLK, while the period defined by the predetermined upper limit value Nmax is "9" in terms of the output number of the clock CLK.

The one-shot generator 16 outputs a constant pulse width signal S activated during a certain period after the count value Ns is initialized. In the present preferred embodiment, the certain period is set to be equal to the period defined by the predetermined upper limit value Nmax (the output number of clock CLK).

The data value judger 13 is supplied with the count value Ns from the counter 12 and the constant pulse width signal S from the one-shot generator 16. In the state where the constant pulse width signal S is inactive (the remainder of the communication reference period after a certain amount of time has passed), the data value judger 13 compares the count value Ns to the predetermined upper limit value Nmax "8". Then, when it is judged that the count value Ns has not reached the predetermined upper limit value Nmax, "8", the data value judger 13 judges that the data pulse Pd is superposed on the reception signal DI at that timing, in other words, that the data value corresponding to the short pulse interval is superposed thereon. Upon the judgment that the count value Ns has reached the predetermined upper limit value Nmax, "8", the data value judger 13 judges that the data pulse Pd is not superposed on the reception signal DI at that timing, in other words, that the data value corresponding to the long pulse interval is superposed thereon.

Next, the operation performed the data is received in the single-wire data communication system according to the present preferred embodiment thus constituted is described referring to a timing chart shown in FIG. 6B.

The counter 12 counts the clock CLK generated by the clock generator 11 and outputs the count value Ns thereby obtained. The counter 12 initializes the count value Ns in synchronization with the rising edge of the clock CLK when the pulse (data pulse Pd or communication reference pulse Ps) is detected in the reception signal DI, and starts (restarts) the count of the clock CLK. After the count value Ns reaches the predetermined upper limit value Nmax, "8", the predetermined upper limit value Nmax is retained as "8", "8", ..., until the next pulse (communication reference pulse Ps) is detected in the reception signal DI. As described, the counter 12 generates the number of the clocks CLK corresponding to the pulse interval of the reception signal DI as the count value Ns until the count value Ns reaches the predetermined upper limit value Nmax, "8", in principle. The count value Ns generated by the counter 12 is given to the data value judger 13 and the one-shot generator 16.

The one-shot generator 16 generates the constant pulse width signal S which rises at the timing by which the count value Ns supplied from the counter 12 is initialized and remains active for a certain period of time, and outputs the generated signal. The constant pulse width signal S remains active though the count value Ns is initialized along the way. The constant pulse width signal S is given to the data value judger 13.

The data value judger 13 compares the count value Ns to the predetermined upper limit value Nmax, "8", during the non-active period of the constant pulse width signal S (the remainder of the communication reference period after a certain amount of time has passed). Then, when it is judged that the count value Ns has not reached the predetermined upper limit value Nmax, "8", the data value judger 13 judges that the data pulse Pd is superposed on the reception signal DI at that timing, in other words, that the data value corresponding to the short pulse interval (data "0" in this example) is superposed thereon. When it is judged that the count value Ns has reached the predetermined upper limit value Nmax, "8", the data value judger 13 judges that the data pulse Pd is not superposed on the reception signal DI at that timing, in other words, that the data value corresponding to the long pulse interval (data "1" in this example) is superposed thereon.

The data judgment thus described is based on the following characteristic according to the present preferred embodiment. In the present preferred embodiment, the pulse detected in the reception signal DI is the data pulse Pd during the period when the constant pulse width signal S by the one-short generator 16 is active, while the pulse detected in the reception signal DI during the non-active period is the communication reference pulse Ps. In the present preferred embodiment wherein the data is thus judged, the data reception can be performed based on the constant communication unit time in the presence of the different data patterns. Further, the synchronization is obtained in the data communication between the interrogator 1 and the responsor 2 irrespective of the clock variability.

Preferred Embodiment 8

Figure 7A:
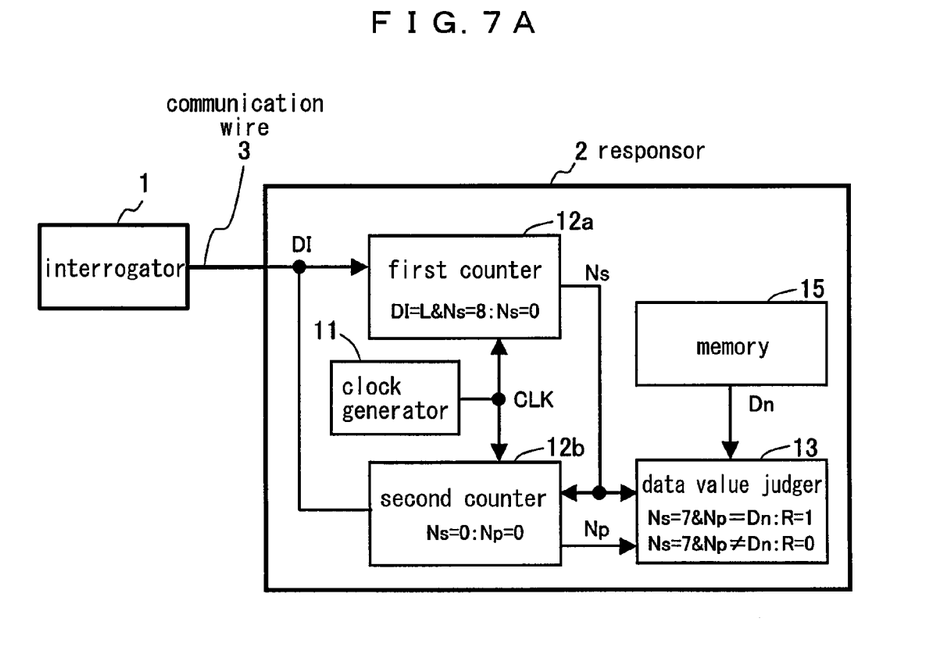
FIG. 7A is a block diagram illustrating a schematic constitution of a communication apparatus according to a preferred embodiment 8 of the present invention.

FIG. 7A is a block diagram illustrating a schematic constitution of a single-wire data communication system according to a preferred embodiment 8 of the present invention. The responsor 2 and the interrogator 1 are connected to each other via the communication wire 3. The responsor 2 comprises the clock generator 11, first counter 12a, second counter 12b, data value judger 13, and memory (non-volatile memory) 15.

The first counter 12a counts the clock CLK generated by the clock generator 11 and outputs the count value Ns thereby obtained. When the pulse (communication reference pulse Ps) is detected in the reception signal DI after the count value Ns reaches the predetermined upper limit value Nmax, "8", the counter 12 initializes the count value Ns and starts (restarts) the count of the clock CLK. The initialization of the count value Ns is asynchronous to the clock CLK. The count value Ns starts from "0", and increases to "1", "2", ..., and finally reaches the predetermined upper limit value Nmax, "8". The predetermined upper limit value Nmax is thereafter retained as "8", "8", ..., until the next pulse (communication reference pulse Ps) is detected in the reception signal DI. When the pulse is detected in the reception signal DI after the count value Ns reaches the predetermined upper limit value Nmax, "8", the detected pulse is regarded as the communication reference pulse Ps, and the count value Ns is reinitialized based on the pulse detection result. The count value Ns by the first counter 12a is given to the second counter 12b and the data value judger 13.

The second counter 12b counts the number of the pulses (data pulse Pd in this case) (received pulse number Np) superposed on the reception signal DI during the period over which the count value Ns is initialized by the first counter 12a and the initialized count value Ns reaches the predetermined upper limit value Nmax, "8". The received pulse number Np is similarly initialized to "0" when the count value Ns is initialized.

Figure 7B:
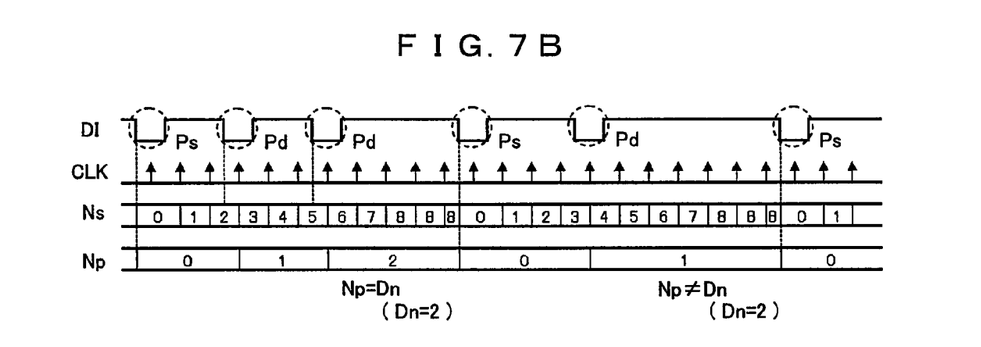
FIG. 7B is a timing chart of the operation of the communication apparatus according to the preferred embodiment 8.

Next, the operation at the time of data reception in the single-wire data communication system according to the present preferred embodiment thus constituted is described referring to a timing chart shown in FIG. 7B.

The first counter 12a counts the clock CLK generated by the clock generator 11 and outputs the count value Ns thereby obtained. When the pulse (communication reference pulse Ps) is detected in the reception signal DI after the count value Ns reaches the predetermined upper limit value Nmax, "8", the first counter 12a initializes the count value Ns and starts (restarts) the count of the clock CLK. The count value Ns starts from "0", and increases to "1", "2", "3", "4", "5", "6", and "7" and finally reaches the predetermined upper limit value Nmax "8". Then, the predetermined upper limit value Nmax, "8", is thereafter retained until the next pulse (communication reference pulse Ps) is detected in the reception signal DI. When the pulse (communication reference pulse Ps) is detected in the reception signal DI after the count value Ns reaches the predetermined upper limit value Nmax, "8", the count value Ns is reinitialized.

When the pulse is detected in the reception signal DI during a period before the time when the count value Ns reaches the predetermined upper limit value Nmax, "8", the first counter 12a recognizes the detected pulse as the data pulse Pd. For example, the pulse detected when the count value Ns is "2" or "5" is recognized as the data pulse Pd. Further, the pulse detected in the reception signal DI after the count value Ns reaches the predetermined upper limit value Nmax, "8", is recognized as the communication reference pulse Ps (showing the start of the data communication unit time). The first counter 12a initializes the count value Ns upon the detection of the communication reference pulse Ps. The first counter 12a supplies the count value Ns to the second counter 12b and the data value judger 13.

The second counter 12b detects the pulse (data pulse Pd) in the reception signal DI during the period over which the count value Ns is initialized by the first counter 12a and the initialized count value Ns reaches the predetermined upper limit value Nmax, "8", and counts the number of the detected pulses, and then, outputs the received pulse number Np showing the counting result.

The data value judger 13 compares the received pulse number Np to a count set value Dn memorized in the memory 15. The received data is judged to be "1" when the received pulse number Np and the count set value Dn are equal, while the received data is judged to be "0" when the received pulse number Np and the count set value Dn are not equal.

As described, according to the present preferred embodiment, the synchronization is obtained in the data communication between the interrogator 1 and the responder 2 irrespective of the clock variability. Further, the received pulse number Np is compared to the count set value Dn memorized in the memory 15 so that the communication data is judged. Therefore, when the count set value Dn in the memory 15 is rewritten, the data transmitted from the apparatus to be communicated with (interrogator), which outputs the different data pulse, can be received by the single responder 2.

In any of the preferred embodiments, hardware or software, or a hybrid structure comprising both the hardware and software may constitute the respective components.

INDUSTRIAL APPLICABILITY

The present invention is effectively applied to the communication technology for executing single-wire data communication in such a manner that synchronization is obtained between communication apparatuses.

What is claimed is:

1. A communication apparatus for performing data communications with another communication apparatus via a single communication wire, comprising:
   a clock generator for generating a clock;
   a counter for counting the clock and continuously counting the clock during a period before the time when a count value thereby obtained reaches a predetermined upper limit value, the counter further continuously setting the predetermined upper limit value as the count value until a pulse is detected in a reception signal received from the another communication apparatus after the count value reaches the predetermined upper limit value, and initializing the count value when the pulse is detected after the count value reaches the predetermined upper limit value; and
   a data value judger for judging a data value based on the pulse detected in the reception signal during a period before the time when the count value reaches the predetermined upper limit value.

2. The communication apparatuses as claimed in claim 1, wherein
   the data value judger judges the data value depending on whether or not the pulse is detected in the reception signal.

3. The communication apparatuses as claimed in claim 1, wherein
   the counter initializes the count value in such a manner that the initialization is synchronous to the clock.

4. The communication apparatuses as claimed in claim 1, wherein
   the counter initializes the count value in such a manner that the initialization is asynchronous to the clock.

5. The communication apparatuses as claimed in claim 1, further comprising an output unit for outputting a transmission signal to another said communication apparatus, wherein
   the data value judger registers the count value at the time when the pulse is detected in the reception signal during a period before the time when the count value reaches the predetermined upper limit value as a count set value, and
   the output unit changes a potential of the transmission signal from a fixed value at the timing by which the count value reaches the predetermined upper limit value when the data value corresponding to the short pulse interval is superposed on the transmission signal, and retains the potential of the transmission signal at the fixed value at any timing when the data value corresponding to the long pulse interval is superposed on the transmission signal.

6. The communication apparatuses as claimed in claim 1, further comprising a memory for memorizing the predetermined upper limit value, wherein the counter and the data value judger read the predetermined upper limit value from the memory and set the read value.

7. The communication apparatuses as claimed in claim 1, wherein the data value judger halts the detection of the pulse in place of the continuous detection of the pulse and terminates the communication with another said communication apparatus without the detection of the pulse in the reception signal when the count value reaches the predetermined upper limit value.

8. The communication apparatuses as claimed in claim 1, wherein the counter comprises:

a first counter for initializing the count value when the pulse is detected in the reception signal and retaining the predetermined upper limit value as the count value until the pulse is detected after the count value reaches the predetermined upper limit value; and a second counter for continuously counting the clock until the count value reaches the predetermined upper limit value and continuously setting the predetermined upper limit value as the count value until the pulse is detected after the count value reaches the predetermined upper limit value, the counter further initializing the count value when the pulse is detected after the count value reaches the predetermined upper limit value, and the data value judger subtracts a result of the counting by the first counter from a result of the counting by the second counter at a timing by which the count value by the second counter reaches the predetermined upper limit value and judges the data value based on a result of the subtraction.

9. The communication apparatuses as claimed in claim 1, further comprising a one-shot generator for outputting a constant pulse width signal which is selectively activated during a period before the time when the count value reaches the predetermined upper limit value after the count value is initialized by the counter and selectively inactivated during a period before the count value is initialized after the count value reaches the predetermined upper limit value, wherein the data value judger compares the count value by the counter to the predetermined upper limit value when the constant pulse width signal is in an inactive state, and judges the data value based on result of the comparison.

10. The communication apparatuses as claimed in claim 1, further comprising a memory for memorizing at least a count set value, wherein the counter comprises:

a first counter for continuously counting the clock until the count value reaches the predetermined upper limit value and retaining the predetermined upper limit value as the count value until the pulse is detected after the count value reaches the predetermined upper limit value, the counter further initializing the count value when the pulse is detected after the count value reaches the predetermined upper limit value; and a second counter for counting the pulse and initializing the pulse count upon the initialization of the count value by the first counter, and the data value judger judges the communication data value based on a result of comparison between the pulse number counted by the second counter and the count set value memorized in the memory.

\* \* \* \* \*